United States Patent
Wachter et al.

[11] 3,873,288
[45] Mar. 25, 1975

[54] RESPIRATOR FILTER CONSTRUCTION

[75] Inventors: Karl August Wachter; Horst Muller, both of Lubeck, Germany

[73] Assignee: Dragerwerk Aktiengesellschaft, Lubeck, Germany

[22] Filed: July 17, 1972

[21] Appl. No.: 272,690

[30] Foreign Application Priority Data
July 17, 1971    Germany............................ 2135813

[52] U.S. Cl........................ 55/497, 55/502, 55/503, 55/511, 55/521, 55/DIG. 31, 55/DIG. 35
[51] Int. Cl.............................................. B01d 39/08
[58] Field of Search............. 55/497, 499, 514, 521, 55/502, 500, DIG. 35, 503, 498, 511, DIG. 31; 210/493

[56]          References Cited
           UNITED STATES PATENTS
3,183,286    5/1965    Harms............................. 55/DIG. 5
2,211,382    9/1940    Nutting............................... 55/500

FOREIGN PATENTS OR APPLICATIONS
193,257     12/1964    Sweden............................... 55/521
1,576,495    5/1970    Germany............................. 55/498
431,215      5/1923    Germany............................. 55/500
502,765      3/1938    United Kingdom................ 210/493

Primary Examiner—Frank W. Lutter
Assistant Examiner—David L. Lacey
Attorney, Agent, or Firm—McGlew and Tuttle

[57]             ABSTRACT

A respirator filter construction comprises a folded filter layer with a ring enclosing its edge which is formed by two ring parts each of which are provided with projections which correspond to the fold line intervals of the filter layer and which interlock to bear tightly with their end faces on respective sides of the folded filter web.

4 Claims, 5 Drawing Figures

RESPIRATOR FILTER CONSTRUCTION

BACKGROUND OF THE INVENTION

1. Field of the Invention

This invention relates in general to the construction of respirators and, in particular, to a new and useful respirator filter formed of a folded filter layer which is held together by oppositely interengageable ring parts having projections which bear in between the recesses of the folds of the filter layer and hold the layer in position.

2. Description of the Prior Art

A filter element for suspended material used in respirators is known which consist of a folded filter layer and a sheet enclosing the upper edge which is provided preferably with a flange for inserting the filter body into the filter housing. The sheet comprises a material that is impermeable to air such as a synthetic resin which is poured in liquid form into the folded filter layer or pressed in the semi-liquid or deformable state.

One known method for the production of a filter element for suspended material in which the folded filter layer is held between two mold cores which form a narrow edge of the folded filter layer around its outer margin, is to insert mold cores holding the filter layer into a hollow mold and then fill the cavity between the hollow mold and the mold cores with a liquid or semi-liquid or deformable material such as a synthetic resin which is used for the production of an impermeable sheath.

Another known method for the production of the filter element for suspended material in respirators of the type in which the filter web is brought, after folding between two ring nozzles which oppose each other coaxially, is to force the plastic through the nozzles for the formation of a plastic ring and thereafter removing the part of the filter web which projects beyond the periphery of the ring. In some instances, the filter web is brought, after folding, between the ring nozzle which is provided with recesses to hold the peripheral edge of the filter web and then the ring nozzle and the feed surface are made to bear on the folded filter web. The plastic is then forced through the ring nozzle for the formation of the plastic ring and subsequently, the part of the filter web projecting over the ring is cut off. This procedure requires working with liquid plastic and a certain temperature range must be accurately maintained.

SUMMARY OF THE INVENTION

In accordance with the present invention, there is provided a filter for suspended material which may be manufactured very easily and without requiring the use of liquid plastics. The invention provides a filter element for suspended material in respirators which comprises a folded filter layer and a ring enclosing its edge. With the invention, the ring is formed of two parts each of which are provided with complimentary projections and recesses which correspond to the folds of the filter layer and which interlock on respective opposite sides of the filter layer in order to hold it centrally therebetween. The ring parts bear tightly with their end faces on respective sides of the filter web and they are advantageously held together by securing means, such as cement. With the inventive design and method, the filter element can be formed of three simple parts which are produced independently of each other and which may be assembled in a simple manner. In the preferred arrangement, both ring parts are provided with flanges at their outer and inner peripheries which permit interlocking of the two parts thereof. These flanges also facilitate the insertion of the filter into a filter housing. In the preferred arrangement, the two ring parts are made of the identical form and they interlock by arranging them in an opposite orientation. With such a construction, only a single plastic part has to be produced.

In accordance with the method of the invention, the filter element for suspended material is formed by bringing a filter web after it is folded between two opposite retainer parts which are provided with recesses and projections which correspond to the folds and then clamping the two ring parts over the filter web so that they bear on respective sides of the filter web and are sealed with the latter. After the parts are so joined and sealed together, the portion of the filter layer which projects beyond the periphery of the retaining parts is cut away.

Accordingly, it is an object of the invention to provide an improved filter construction, which comprises a folded filter web with a ring enclosing its edge which is made up of two interengageable parts having projections and recesses which are corresponding to the folds of the filter web and which interlock from respective opposite sides over the filter web.

A further object of the invention, is to provide a method for forming a filter which comprises arranging a web between two retaining parts after the web is first folded and clamping the retaining parts around the edge of the web to hold the web in a folded orientation between the retaining parts and subsequently severing the portion of the web which extends beyond the periphery of the retaining parts.

A further object of the invention is to provide a respirator filter which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
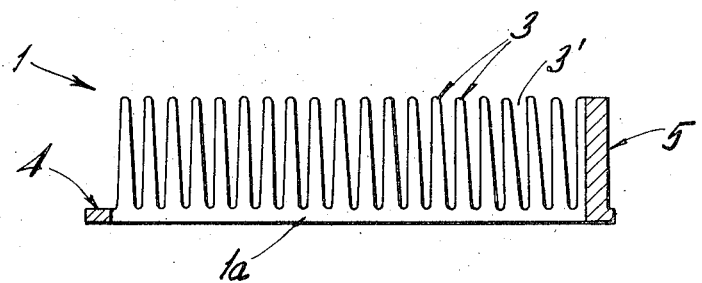
FIG. 1 is a transverse sectional view of a retaining ring part for securing a filter web, constructed in accordance with the invention.
Figure 2:
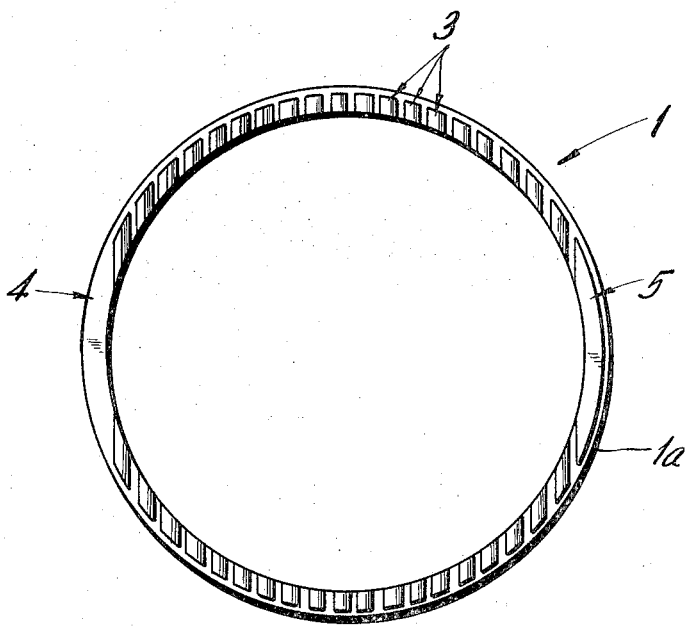
FIG. 2 is a top plan view of the retaining ring shown in FIG. 1.
Figure 3:
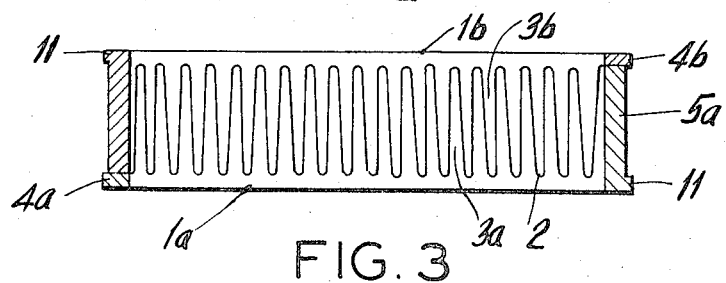
FIG. 3 is a view similar to FIG. 1 but showing interengagement of the two ring parts of the retaining ring.
Figure 4:
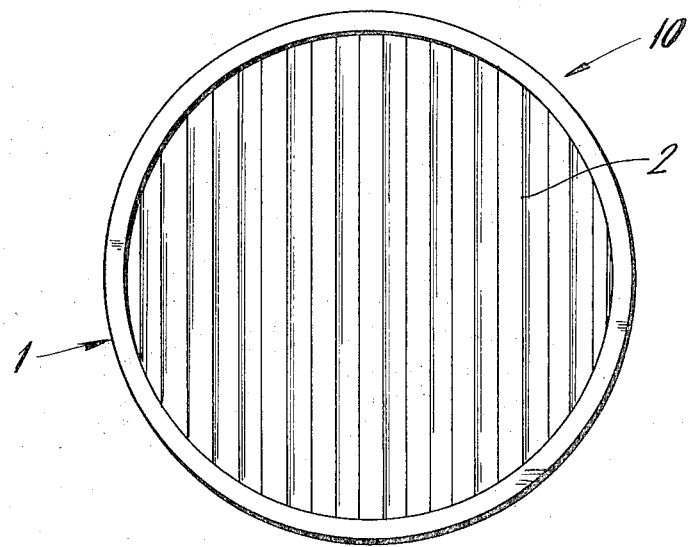
FIG. 4 is a top plan view of the complete filter assembly.

Referring to the drawings in particular, the invention embodied therein, comprises an improved respirator filter element, generally designated 10, which comprises a folded filter layer 2, having a ring, generally designated 1, which encloses its peripheral edge.

In accordance with the invention, the ring 1 is made up of two ring parts 1a and 1b, each of which include projections 3 and recesses 3a, which correspond to the folds or pleats of a filter element or web 2. On one side of the ring elements 1a and 1b, they terminate in a flat ring segment 4, and the opposite side has a segment 5 which is of the height of the projections 3.

Two ring parts 1a and 1b may be arranged in opposite relationship and rotated by 180° and interlocked over the filter element 2 to cause interengagement of the projections 3a of the part 1a between the projections 3b of the part 1b. The segment part 5a of the ring 1a is arranged opposite to the segment part 4b of the ring 1b in the interlocked position.

In the preferred arrangement, the ring parts 1a and 1b are secured together for example by applying an adhesive or cement between the end faces of the toothed projections 3a and 3b to cement them together with the filter web 2. A self-hardening cement can be used.

In accordance with the method of the invention, a filter element or filter web 6 is first folded and then brought between two opposing ring part receivers 7 and 8 for receiving the two ring parts 1a and 1b. The end faces of the ring parts are first coated with an adhesive or cement. This can be done by brushing or dipping. The two ring parts 1a and 1b are then moved together until the filter web is clamped tightly therebetween.

For holding the filter web during the production, the receivers 7 and 8 can themselves be ring-shaped so that the retainer parts 9 and 10 can be guided by them. These retaining parts 9 and 10 are provided with recesses corresponding to the folds of the filter webs 6 and thus they hold the filter web firmly in the proper position when the ring parts are attached. The outside diameters of the retaining parts 9 and 10 holding the filter web 6 are smaller than the inside diameter of the ring parts 1a and 1b so that the ring parts can be pushed over the retaining parts 9 and 10. The parts 9 and 10 are formed with opposing surfaces in the outline of the folded web so that they may be moved together to interlock with the web when the ring 1 is applied.

Figure 5:
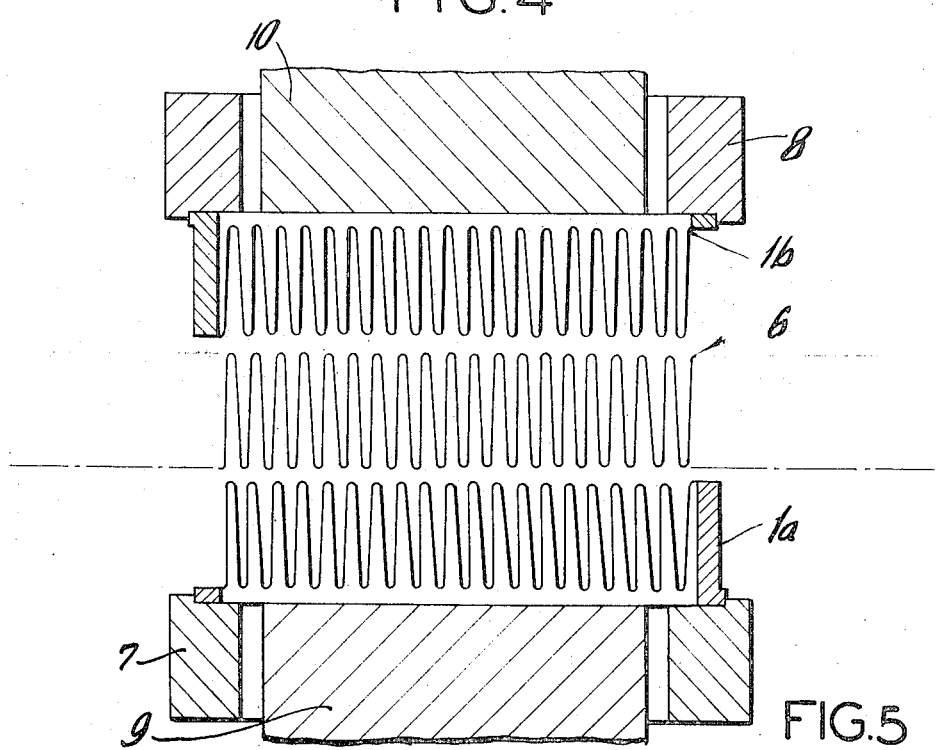
FIG. 5 is a partial transverse sectional view showing the positioning of the ring parts when they are clamped together over the intermediate filter element.

The ring parts 1a and 1b are also advantageously provided with an outwardly extending flange 11 for the guidance of the assembly of the filter element 10 into a filter housing. At the end of the manufacturing process, as shown in FIG. 5, any portion of the filter web which projects beyond the periphery of the ring parts 1a and 1b may be cut off.

While a specific embodiment of the invention has been shown and described in detail to illustrate the application of the principles of the invention, it will be understood that the invention may be embodied otherwise without departing from such principles.

What is claimed is:

1. A respirator filter comprising a folded filter layer and a ring enclosing the periphery of said filter layer, said ring including two outer identical interengageable annular ring parts each ring part having opposed edges with complimentary projections and recesses corresponding to the folds of said filter layer which are correlated and interengaged together over the folds of the filter layer and bear tightly against respective sides of the filter layer, and a cement disposed on said projections and recesses and securing each ring to said filter layer.

2. A respirator filter, according to claim 1, wherein at least one of said ring parts includes an outwardly extending flange providing a guide for inserting the filter element into a filter housing.

3. A method for producing a filter element for respirators using two identical ring parts each having opposed edges with interengageable complimentary projections and recesses, comprising folding a filter web to form a plurality of pleats, arranging the folded web between the two oppositely arranged ring parts which have projections and recesses of a number and spacing corresponding to the pleats, coating the projections and recesses of the ring parts with cement and bringing the ring parts together over the folded filter web to secure the parts together.

4. A method for producing a filter element for respirators, according to claim 3, wherein the ring parts are provided with spaced projections and recesses which interengage and which correspond in dimension to the pleats of the filter so that they hold the filter in the pleated form and wherein the ring parts are interengaged over the filter web and connected with it in a manner to cause substantially complete contact engagement between said pleats and said projections.

* * * * *